(12) United States Patent
Okura et al.

(10) Patent No.: US 11,507,746 B2
(45) Date of Patent: Nov. 22, 2022

(54) METHOD AND APPARATUS FOR GENERATING CONTEXT INFORMATION

(71) Applicant: FUJITSU LIMITED, Kawasaki (JP)

(72) Inventors: Seiji Okura, Setagaya (JP); Masahiro Kataoka, Kamakura (JP); Satoshi Onoue, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 389 days.

(21) Appl. No.: 16/594,201

(22) Filed: Oct. 7, 2019

(65) Prior Publication Data

US 2020/0117710 A1    Apr. 16, 2020

(30) Foreign Application Priority Data

Oct. 10, 2018   (JP) .............................. JP2018-192040

(51) Int. Cl.
| | |
|---|---|
| *G06F 40/274* | (2020.01) |
| *G06N 20/00* | (2019.01) |
| *G06F 40/56* | (2020.01) |
| *G06V 30/414* | (2022.01) |
| *G06V 30/416* | (2022.01) |

(52) U.S. Cl.
CPC ............ *G06F 40/274* (2020.01); *G06F 40/56* (2020.01); *G06N 20/00* (2019.01); *G06V 30/414* (2022.01); *G06V 30/416* (2022.01)

(58) Field of Classification Search
CPC ................................. G06F 40/02; G06F 40/03
See application file for complete search history.

(56) References Cited

U.S. PATENT DOCUMENTS

| | | | |
|---|---|---|---|
| 10,460,229 B1 * | 10/2019 | Yuan ..................... | G06F 40/268 |
| 10,769,383 B2 * | 9/2020 | Cao ......................... | G06N 3/08 |
| 10,817,509 B2 * | 10/2020 | Korpusik .............. | G06F 16/284 |
| 11,068,660 B2 * | 7/2021 | Al Hasan ................ | G06N 3/08 |
| 11,080,483 B1 * | 8/2021 | Islam ...................... | G06F 16/35 |
| 2017/0270097 A1 * | 9/2017 | Kobayashi ............. | G06F 40/30 |

(Continued)

FOREIGN PATENT DOCUMENTS

| | | |
|---|---|---|
| JP | H10-171806 A | 6/1998 |
| JP | 2017-167986 A | 9/2017 |

OTHER PUBLICATIONS

Mikolov, Tomas, et al. "Distributed representations of words and phrases and their compositionality." Advances in neural information processing systems. 2013. (Year: 2013).*

(Continued)

*Primary Examiner* — Douglas Godbold
(74) *Attorney, Agent, or Firm* — Fujitsu Patent Center

(57) ABSTRACT

A memory stores therein a document and a plurality of word vectors that are word embeddings respectively computed for a plurality of words. A processor extracts, with respect to one of the words, two or more surrounding words within a prescribed range from one occurrence position where the one word occurs, from the document, and computes a sum vector by adding word vectors corresponding to the surrounding words. The processor determines a parameter such as to predict the surrounding words from the sum vector and the parameter using a machine learning model. The processor stores the parameter as context information for the one occurrence position, in association with the word vector corresponding to the one word.

7 Claims, 15 Drawing Sheets

(56) References Cited

U.S. PATENT DOCUMENTS

| | | | | |
|---|---|---|---|---|
| 2017/0286397 | A1* | 10/2017 | Gonzalez | G06F 40/35 |
| 2018/0157644 | A1* | 6/2018 | Mandt | G06F 40/284 |
| 2018/0336183 | A1* | 11/2018 | Lee | G06N 3/0454 |
| 2018/0357216 | A1* | 12/2018 | Bakis | G06F 16/903 |
| 2019/0130305 | A1* | 5/2019 | Sivertson | G06N 5/003 |
| 2019/0155945 | A1* | 5/2019 | Zhelezniak | G06F 16/3347 |
| 2019/0187955 | A1* | 6/2019 | Green | G06F 40/40 |
| 2020/0175119 | A1* | 6/2020 | Chung | G06F 40/30 |
| 2020/0202211 | A1* | 6/2020 | Indenbom | G06N 3/084 |
| 2020/0218857 | A1* | 7/2020 | Shen | G16H 20/00 |
| 2021/0042472 | A1* | 2/2021 | Nishida | G06F 16/332 |

OTHER PUBLICATIONS

Neelakantan, Arvind, et al. "Efficient non-parametric estimation of multiple embeddings per word in vector space." arXiv preprint arXiv:1504.06654 (2015). (Year: 2015).*

* cited by examiner

DOCUMENT

考えが甘い。りんごが甘い。
(KANGAE GA AMAI. RINGO GA AMAI.)
意義を唱える。異議を唱える。
(IGI WO TONAERU. IGI WO TONAERU.)
行くことに意義がある。・・・
(IKU KOTO NI IGI GA ARU. ・・・)

⇩

SURROUNDING WORD TABLE

| WORD | SURROUNDING WORD |
|---|---|
| 考え (KANGAE) | 甘い (AMAI) |
| 甘い (AMAI) | 考え (KANGAE) |
| りんご (RINGO) | 甘い (AMAI) |
| 甘い (AMAI) | りんご (RINGO) |
| 意義 (IGI) | 唱える (TONAERU) |
| 唱える (TONAERU) | 意義 (IGI) |
| 異議 (IGI) | 唱える (TONAERU) |
| 唱える (TONAERU) | 異議 (IGI) |
| 行く (IKU) | こと, 意義, ある (KOTO, IGI, ARU) |
| こと (KOTO) | 行く, 意義, ある (IKU, IGI, ARU) |
| 意義 (IGI) | 行く, こと, ある (IKU, KOTO, ARU) |
| ある (ARU) | 行く, こと, 意義 (IKU, KOTO IGI) |
| ・・ | ・・・ |

FIG. 5

WORD VECTOR TABLE

| WORD | WORD VECTOR |
|---|---|
| 考え (KANGAE) | (1.38, 0.02, 0.38, 0.001, 0.007, 0.013, ⋯) |
| りんご (RINGO) | (−0.02, 1.38, 0.33, −0.13, −0.03, 0.001, ⋯) |
| 唱える (TONAERU) | (0.05, −0.13, −1.83, 0.05, 0.01, −0.02, ⋯) |
| 行く (IKU) | (−0.01, −0.13, 0.23, 1.23, 0.01, −0.02, ⋯) |
| こと (KOTO) | (0.10, 0.15, −0.15, −0.08, 0.85, 0.00, ⋯) |
| ある (ARU) | (0.13, 0.21, −0.11, 0.09, 0.12, 1.28, ⋯) |
| ⋯ | ⋯ |

METHOD AND APPARATUS FOR GENERATING CONTEXT INFORMATION

CROSS-REFERENCE TO RELATED APPLICATION

This application is based upon and claims the benefit of priority of the prior Japanese Patent Application No. 2018-192040, filed on Oct. 10, 2018, the entire contents of which are incorporated herein by reference.

FIELD

The embodiments discussed herein relate to a method and apparatus for generating context information.

BACKGROUND

In the fields of natural language processing in which documents written in natural language are processed, word embedding vectors may be used as feature information representing the features of words. Word embedding captures word meaning (definition) and provides a way to associate similar vectors with words having similar meanings. The use of the word embedding vectors enables efficient search for similar sentences to a query sentence, which in turn makes it possible to provide a variety of natural language processing services including machine translation and dialogue systems.

For example, word embedding vectors are generated in the following manner. With respect to each word in a training document, its surrounding words, which occur in the vicinity of the word, are extracted from the training document, and then a machine learning model such as a neural network is trained so that it is able to predict the surrounding words of the word from the word. Here, the machine learning model is trained through unsupervised learning, which does not need to assign teacher labels to the training document. After the training, each word is fed to the machine learning model to cause the machine learning model to compute a vector, and the computed vector is extracted and associated with the word as a word embedding vector. In this connection, similar vectors may be computed for words that are different but often have similar surrounding words in their vicinities.

There has been proposed a lexical ambiguity resolving apparatus that determines the correct meaning of a word with two or more possible meanings in a sentence. This proposed lexical ambiguity resolving apparatus is designed to read a training document previously assigned teacher labels, each indicating a meaning of an observable word, and to learn statistical information, such as a frequency of co-occurrence between an observable word and its surrounding words, with distinguishing different meanings of the observable word. The lexical ambiguity resolving apparatus reads an input document to be processed, and determines the meaning of an observable word in the input document on the basis of surrounding words in the vicinity of the observable word in the input document and the statistical information previously learned for each meaning. In addition, there has been proposed a determination apparatus that extracts word embedding vectors for three words and computes the angle formed by the extracted three vectors as an index about relevance among these three words.

See, for example, Japanese Laid-open Patent Publication No. 10-171806.

Also see Japanese Laid-open Patent Publication No. 2017-167986.

However, the above conventional technique of associating word embedding vectors with words is designed to associate a unique vector with each word spelling. Since the relationships between word spellings and vectors are fixed, an expectation of associating similar vectors with words having similar meanings is unlikely satisfied, which degrades the search accuracy for similar sentences.

If a word with two or more different meanings in a training document is not assigned a teacher label indicating the correct meaning of the word, the word may always be identified as meaning the same thing, without taking into account its context, and therefore an average vector may be computed without distinguishing the different meanings. In addition, for example, if a training document contains a spelling mistake or spelling variant of a word, the different spelling of the word is likely to be identified as representing a different word. In this case, a dissimilar vector is likely to be computed for the different spelling of the word based on the spelling mistake or spelling variant, because of a statistical process that probably generates a different vector for a word whose spelling has a lower frequency of occurrence. As described above, the conventional word embedding has a difficulty in handling the context of a word at each occurrence position.

One of methods that handle context may be to associate one vector with a series of a plurality of continuous words using a machine learning model, such as a recurrent neural network (RNN) or long short-term memory (LSTM). This method, however, needs a vast amount of computation. In addition, information on the order of surrounding words is extra information for determining the identity between contexts.

SUMMARY

According to one aspect, there is provided a context information generation method that includes: obtaining, by a processor, a document including a sentence made up of a plurality of words and a plurality of word vectors that are word embeddings respectively computed for the plurality of words; extracting, by the processor, with respect to one of the plurality of words, two or more surrounding words within a prescribed range from one occurrence position where the one word occurs, from the document, and computing a sum vector by adding two or more word vectors respectively corresponding to the two or more surrounding words; determining, by the processor, a parameter such as to predict the two or more surrounding words from the sum vector and the parameter using a prescribed machine learning model that predicts surrounding words; and storing, by the processor, the parameter as context information for the one occurrence position, in association with a word vector corresponding to the one word.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of computing word vectors, or word embeddings;

FIG. 6 illustrates a continuation of the example of computing word vectors, or word embeddings;

DESCRIPTION OF EMBODIMENTS

Hereinafter, preferred embodiments will be described below with reference to the accompanying drawings.

First Embodiment

A first embodiment will be described.

Figure 1:
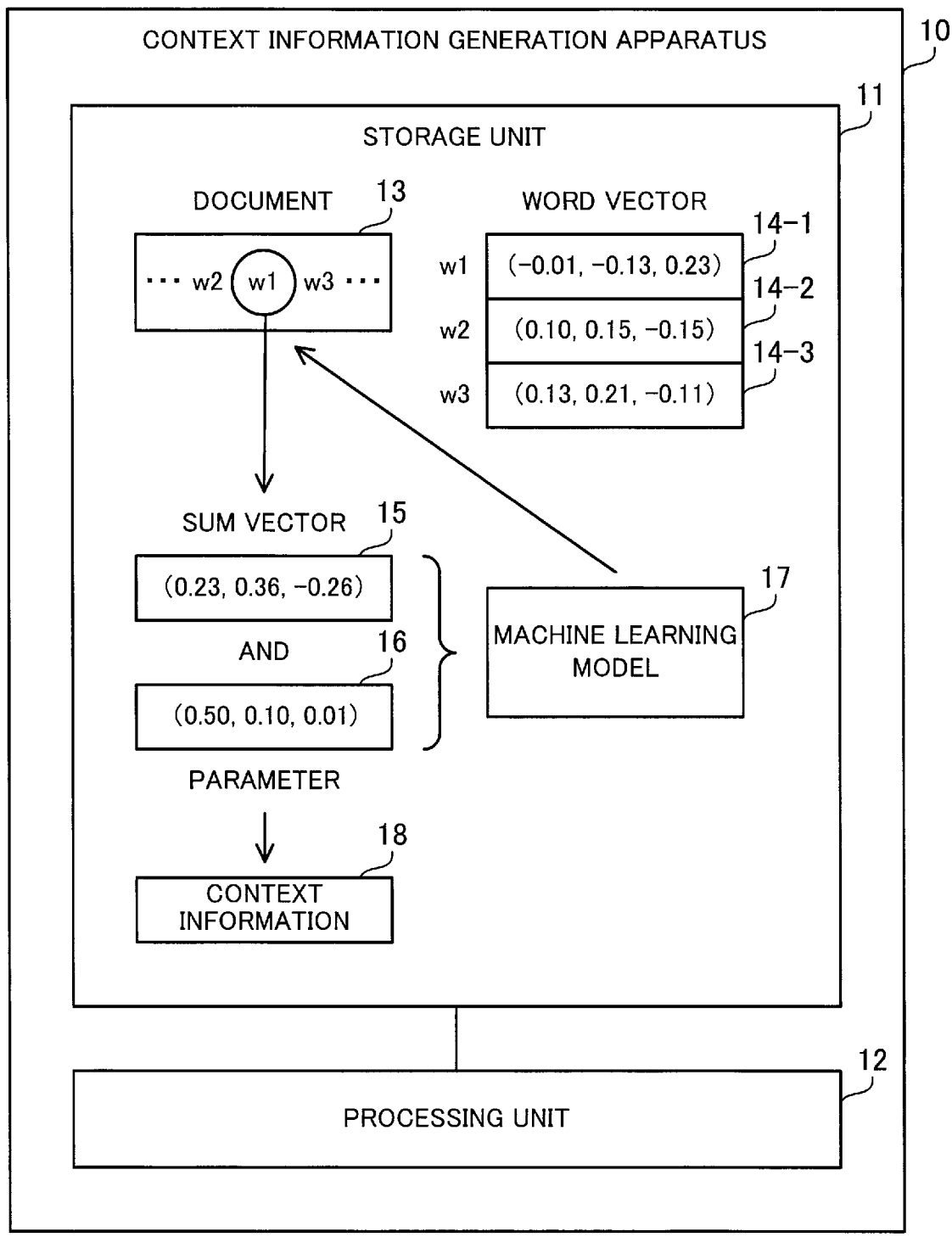
FIG. 1 is a view for explaining an example of a context information generation apparatus.

FIG. 1 is a view for explaining an example of a context information generation apparatus.

The context information generation apparatus 10 of the first embodiment is designed to analyze a document written in natural language in order to promote natural language processing, such as searching for similar sentences. The context information generation apparatus 10 may be used for a variety of natural language processing services including machine translation and dialogue systems. The context information generation apparatus 10 may be called a computer or an information processing apparatus. The context information generation apparatus 10 may be a client apparatus, which is operated by a user, or a server apparatus, which is accessible over a network.

The context information generation apparatus 10 includes a storage unit 11 and a processing unit 12. The storage unit 11 may be a volatile semiconductor memory device, such as random access memory (RAM), or a non-volatile storage device, such as a hard disk drive (HDD) or flash memory. The processing unit 12 is a processor, such as a central processing unit (CPU), a graphics processing unit (GPU), or a digital signal processor (DSP), for example. In this connection, the processing unit 12 may include an application-specific integrated circuit (ASIC), a field programmable gate array (FPGA), or another application-specific electronic circuit. A set of multiple processors may be called a "multiprocessor" or simply a "processor."

The storage unit 11 stores therein a document 13 including a sentence that is made up of a plurality of words including words w1, w2, and w3. A single sentence is formed by putting two or more words in chronological order. The "word" here means a kind of word with a specific spelling. A single occurrence of each word may be called a "word instance," "occurrence word," or another. The document 13 may include the same word at two or more different occurrence positions.

In addition, the storage unit 11 stores therein a plurality of word vectors that are word embeddings respectively computed for a plurality of words that may occur in the document 13. Each word vector, or word embedding, has a prescribed number (two or more) of dimensions (for example, 200 dimensions). For example, the storage unit 11 stores word vectors 14-1, 14-2, and 14-3 respectively corresponding to the words w1, w2, and w3. Word embedding captures word meaning and provides a way to compute similar word vectors for words with similar meanings. Word vectors, or word embeddings, may be computed using Word2vec or GloVe, for example. In addition, word vectors may be computed based on the document 13 or another document.

With respect to one occurrence position where one word occurs in the document 13, the processing unit 12 generates context information indicating context at the occurrence position. In word embedding, a unique word vector is associated with each word spelling. Therefore, two or more meanings of a word are not distinguishable on the basis of only a corresponding word vector. In addition, if a plurality of different word spellings exist for the same word due to spelling mistakes or spelling variants, it would be difficult to confirm the relevance among the plurality of word spellings on the basis of only their associated word vectors. To deal with these, the processing unit 12 prepares information indicating context at each occurrence position of each word, in addition to word vectors. The context indicates the meaning of the word and in what surrounding the word is used.

More specifically, with one occurrence position of one word as a reference, the processing unit 12 extracts two or more surrounding words of the word within a prescribed range from the reference occurrence position, from the document 13. For example, the prescribed range may be set to a range of words (as many words as n×2) that occur before and after a reference occurrence position in the same sentence as the reference occurrence position. That is, this range includes n words occurring before a reference occurrence position and n words occurring after the reference occurrence position. Here, n is a prescribed natural number. Alternatively, a range of only n words occurring either before or after a reference occurrence position may be set as the prescribed range. For example, with one occurrence position of the word w1 as a reference, the processing unit 12 extracts surrounding words w2 and w3 occurring before and after the reference occurrence position.

The processing unit 12 computes a sum vector 15 of two or more word vectors corresponding to the extracted two or more surrounding words among the plurality of word vectors stored in the storage unit 11. For example, the processing unit 12 computes the sum vector 15 by adding the word vectors 14-2 and 14-3 corresponding to the surrounding words w2 and w3. Note that two or more word vectors are added by adding their values in each dimension. Therefore, the sum vector 15 has the same dimensions as the two or more word vectors.

Note that there may be only one surrounding word within the above prescribed range because of the number of words in a sentence or the occurrence position of a target word in the sentence. In such a case, a word vector corresponding to the extracted one surrounding word may be used as the sum vector 15. If a target word is located at the beginning of a sentence, k virtual dummy words (k is a natural number of n or greater) may be inserted at the beginning of the sentence, and then surrounding words may be extracted. In this case, these dummy words may be ignored in computation of a sum vector 15. Similarly, if a target word is located at the end of a sentence, k virtual dummy words may be inserted at the end of the sentence, and then surrounding words may be extracted. In this case, these dummy words may be ignored in computation of a sum vector 15. This approach simplifies the process of extracting surrounding words.

The processing unit 12 determines a parameter 16 such as to predict the above two or more surrounding words from the sum vector 15 and the parameter 16 using a prescribed machine learning model 17. The machine learning model 17 is designed to receive an input vector and output a result of predicting surrounding words. The machine learning model 17 may be a neural network. Alternatively, a machine learning model used in computation of word vectors, or word embeddings, may be repurposed.

The parameter 16 may be a conversion filter that converts the sum vector 15 into an input vector that is to be input to the machine learning model 17. For example, the processing unit 12 multiplies the values in the dimensions of the sum vector 15 by the values in the corresponding dimensions of the parameter 16. The parameter 16 may be a vector with the same dimensions as the sum vector 15 or with fewer dimensions than the sum vector 15. In the latter case, the processing unit 12 may allot one dimension of the parameter 16 to a prescribed number of adjacent dimensions of the sum vector 15. For example, one dimension of the parameter 16 may be allotted to four adjacent dimensions of the sum vector 15. This allows the sum vector 15 to have 200 dimensions and the parameter 16 to have 50 dimensions.

The processing unit 12 adjusts the parameter 16 so that a result of predicting surround words, output from the machine learning model 17, comes closer to the two or more surrounding words extracted from the document 13. For example, the processing unit 12 repeats a process of generating an input vector by applying the parameter 16 to the sum vector 15, feeding the input vector to the machine learning model 17 to obtain a result of predicting surrounding words, comparing the predicted surrounding words with the correct surrounding words, and updating the parameter 16.

Then, the processing unit 12 stores the parameter 16 as context information 18 in association with the word vector corresponding to the word occurring at the reference occurrence position. The context information 18 indicates the context at the occurrence position. For example, the processing unit 12 stores the context information 18 in association with the word vector 14-1 corresponding to the word w1, with respect to the one occurrence position of the word w1. If the parameter 16 is a conversion filter, then the context information 18 may be called a "context filter." The context information 18 may be stored separate from the word vector 14-1 of the word w1. Alternatively, an extended vector may be generated by concatenating the word vector 14-1 and the context information 18 and stored with respect to the occurrence position.

Different context information may be generated for different occurrence positions of the same word. Especially, with respect to a word having two or more meanings, dissimilar context information may be generated for the different occurrence positions. On the other hand, for words that are actually the same but are identified as different due to a spelling mistake or spelling variant, similar context information may be generated.

As described above, the context information generation apparatus 10 of the first embodiment computes a sum vector 15 by adding the word vectors of surrounding words of one word, with respect to one occurrence position of the one word, and determines a parameter 16 such as to correctly predict the surrounding words from the sum vector 15 using the machine learning model 17. Then, the context information generation apparatus 10 stores the determined parameter 16 as context information 18 that indicates context at the one occurrence position.

In the above approach, it is possible to represent context in a compact way for each occurrence position of words. Sum vectors 15 themselves, each generated by adding the word vectors of surrounding words of a word, have ambiguity because a similar vector may happen to be generated from a combination of unexpected different surrounding words. By contrast, the use of parameters 16 as context information 18 enables distinguishing different contexts from each other. In addition, since the word vectors of surrounding words are not concatenated but added, it is possible to prevent an increase in the number of dimensions in vectors. Thus, compared with machine learning algorithms taking into account the order of surrounding words, it is possible to reduce complexity of machine learning and to efficiently generate sufficient information for distinguishing contexts.

In addition, dissimilar context information may be generated for different occurrence positions of a word with two or more meanings. Therefore, for example, by performing a search process of narrowing down sentences using not only word vectors but also context information, it is possible to improve the search accuracy for similar sentences. Further, by assigning labels for distinguishing different meanings of a word to occurrence positions of the word on the basis of context information, it is possible to improve the accuracy of subsequent natural language processing. Still further, similar context information may be generated for different word spellings that occur due to a spelling mistake or spelling variant. Therefore, for example, by performing the search process using context information, it is possible to detect a word spelling that is probably a spelling mistake or spelling variant.

Second Embodiment

A second embodiment will now be described.

The machine learning apparatus 100 of the second embodiment is a natural language processing apparatus that analyzes a document written in natural language through machine learning using a neural network. The machine learning apparatus 100 is able to find similar sentences to a certain sentence on the basis of an analysis result. The machine learning apparatus 100 is usable for a variety of services using natural language, such as machine translation, recommendation systems, and Q&A systems. The machine learning apparatus 100 may be called a computer or an information processing apparatus. The machine learning apparatus 100 may be a client apparatus, which is used by a user, or a server apparatus, which is accessible over a network.

Figure 2:
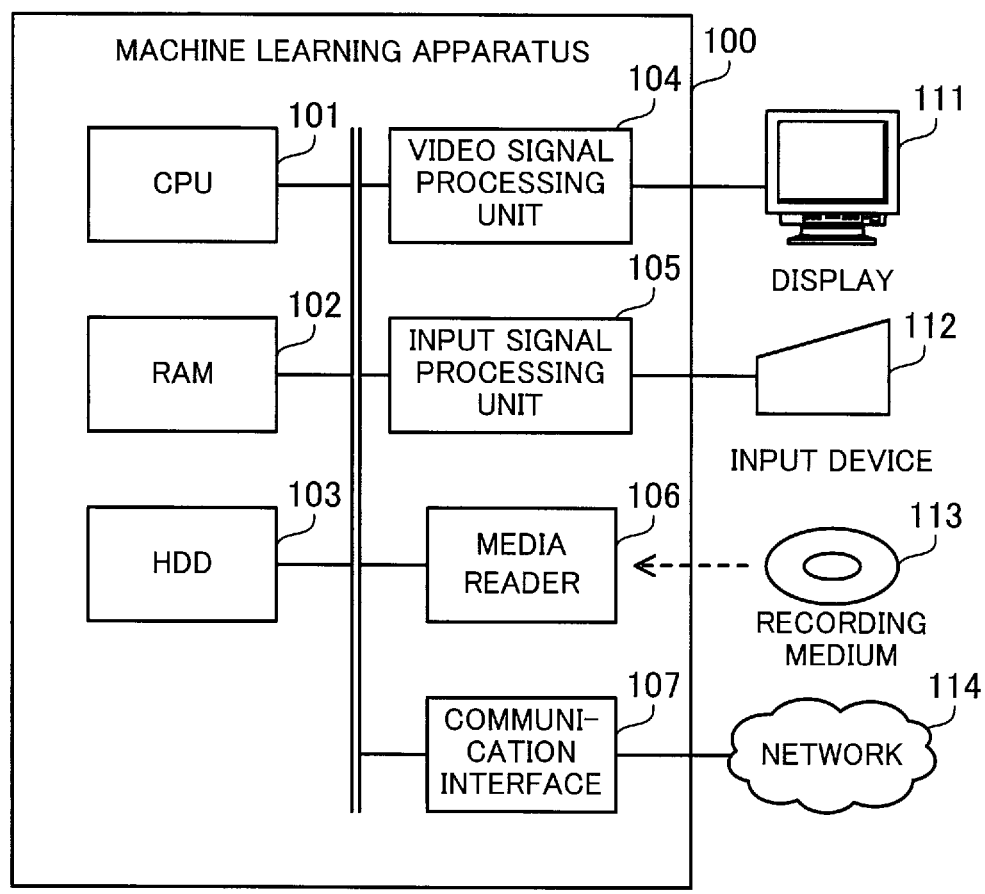
FIG. 2 is a block diagram illustrating an example of a hardware configuration of a machine learning apparatus.

FIG. 2 is a block diagram illustrating an example of a hardware configuration of a machine learning apparatus.

The machine learning apparatus 100 includes a CPU 101, a RAM 102, an HDD 103, a video signal processing unit 104, an input signal processing unit 105, a media reader 106, and a communication interface 107, which are connected to a bus. The machine learning apparatus 100 corresponds to the context information generation apparatus 10 of the first embodiment. The CPU 101 corresponds to the processing unit 12 of the first embodiment. The RAM 102 or HDD 103 corresponds to the storage unit 11 of the first embodiment.

The CPU 101 is a processor that executes program instructions. The CPU 101 loads at least part of a program and data from the HDD 103 to the RAM 102 and then runs the program. In this connection, the CPU 101 may be configured with a plurality of processor cores, and the machine learning apparatus 100 may be configured with a plurality of processors. A set of multiple processors may be called a "multiprocessor" or simply a "processor."

The RAM 102 is a volatile semiconductor memory that temporarily stores programs to be executed by the CPU 101 or data to be used by the CPU 101 in processing. In this connection, the machine learning apparatus 100 may be configured with another kind of memory than RAM or with a plurality of memories.

The HDD 103 is a non-volatile storage device that stores software programs, such as an operating system (OS), middleware and application software, and data. In this connection, the machine learning apparatus 100 may be configured with another kind of storage device, such as flash memory or solid state drive (SSD), or with a plurality of storage devices.

The video signal processing unit 104 outputs images to a display 111 connected to the machine learning apparatus 100 in accordance with commands from the CPU 101. As the display 111, a desired kind of display may be used, such as a cathode ray tube (CRT) display, a liquid crystal display (LCD) or an organic Electro-Luminescence (OEL) display.

The input signal processing unit 105 receives an input signal from an input device 112 connected to the machine learning apparatus 100. As the input device 112, a desired kind of input device may be used, such as a mouse, a touch panel, a touchpad, or a keyboard. In addition, plural kinds of input devices may be connected to the machine learning apparatus 100.

The media reader 106 is a reading device that reads programs and data from a recording medium 113. As the recording medium 113, a magnetic disk, such as a flexible disk (FD) or an HDD, an optical disc, such as a compact disc (CD) or a digital versatile disc (DVD), a magneto-optical disk (MO), or a semiconductor memory may be used. For example, the media reader 106 stores programs and data read from the recording medium 113 into the RAM 102 or HDD 103.

The communication interface 107 is connected to a network 114 to perform communication with other information processing apparatuses over the network 114. The communication interface 107 may be a wired communication interface that is connected to a wired communication device, such as a switch or a router, or a wireless communication interface that is connected to a base station or an access point.

Figure 3:
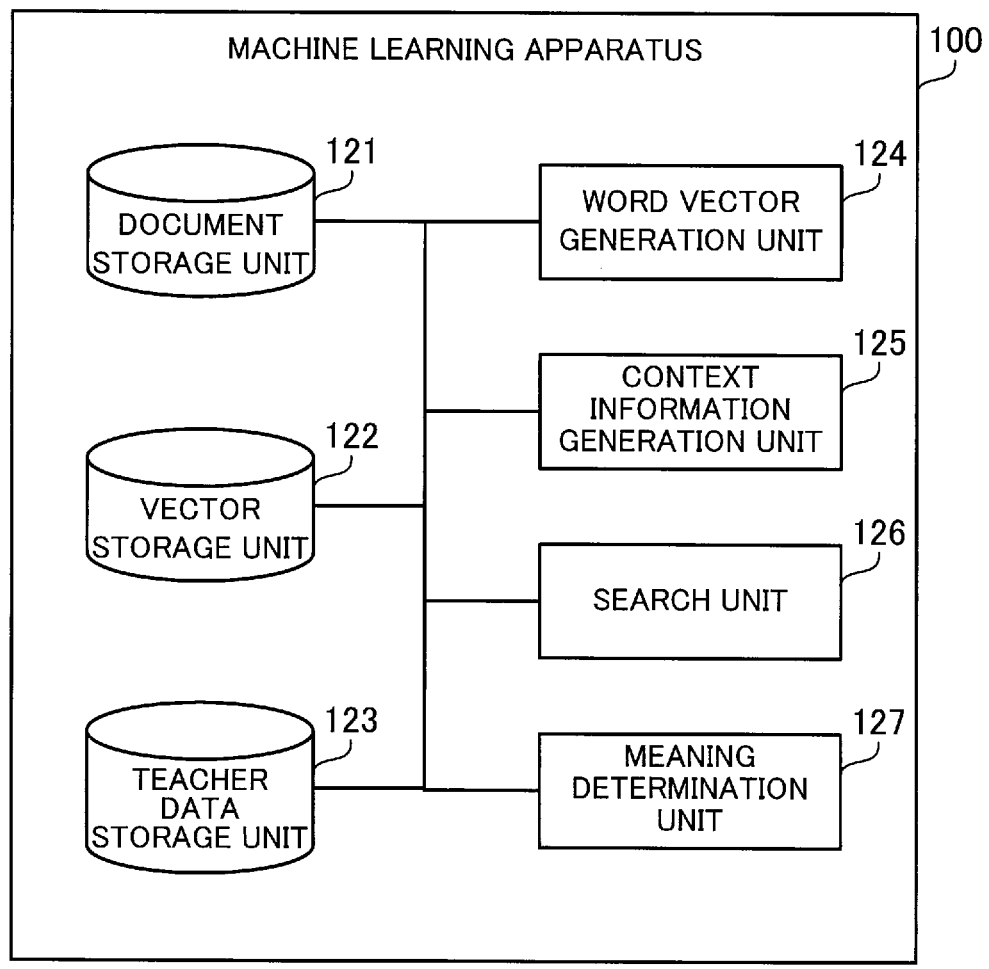
FIG. 3 is a block diagram illustrating an example of functions of the machine learning apparatus.

FIG. 3 is a block diagram illustrating an example of functions of the machine learning apparatus.

The machine learning apparatus 100 includes a document storage unit 121, a vector storage unit 122, a teacher data storage unit 123, a word vector generation unit 124, a context information generation unit 125, a search unit 126, and a meaning determination unit 127. The document storage unit 121, vector storage unit 122, and teacher data storage unit 123 are implemented by using storage space in the RAM 102 or HDD 103, for example. The word vector generation unit 124, context information generation unit 125, search unit 126, and meaning determination unit 127 are implemented by using programs to be executed by the CPU 101, for example.

The document storage unit 121 stores therein a document written in natural language. The document is dividable into two or more sentences, which are further dividable into two or more series of words. Words are grammatically meaningful character strings. In the second embodiment, a "word" is a unit defined by a specific character string, and a "word instance" indicates a specific occurrence position of a word in a sentence. The document may use the same word plural times, and therefore a plurality of word instances may exist for the same word.

The vector storage unit 122 stores therein word vectors that are word embeddings and are associated with individual words by analyzing the document. Word embedding captures word meaning and provides a way to associate similar word vectors with words having similar meanings. For example, each word vector is a vector with 200 real-valued dimensions. A word vector is computed for each word, and therefore a plurality of word instances relating to the same word share the same word vector.

Also, the vector storage unit 122 stores therein extended vectors associated with individual word instances. An extended vector for a word instance is generated by appending a context filter corresponding to the word instance to the word vector associated with the word instance. The context filter is context information indicating context at the occurrence position indicated by the word instance. The context indicates the meaning of the word at the occurrence position and in what surrounding the word is used. For example, the context filter is a vector with 50 real-valued dimensions. A plurality of word instances relating to the same word may have different context filters.

The teacher data storage unit 123 stores therein teacher data for resolving ambiguity at word instances relating to a word with two or more meanings. Some of word instances relating to a word with two or more meanings are manually assigned teacher labels indicating their correct meanings as teacher data. As will be described later, the other word instances are automatically assigned labels indicating their meanings on the basis of the teacher labels and context filters.

The word vector generation unit 124 analyzes the document stored in the document storage unit 121 and associates a word vector, or word embedding, with each word with unsupervised learning. To generate a word vector for a word, the word vector generation unit 124 extracts a correspondence among the word and its surrounding words from the document, and trains a neural network so that it is able to predict the surrounding words from the word. The word vector generation unit 124 feeds the word to the neural network and extracts a vector computed at its intermediate layer, as a word vector corresponding to the word.

The context information generation unit 125 computes, with respect to each word instance, a context filter as context information, using word vectors generated by the word vector generation unit 124. Here, the context filter is computed using the neural network trained by the word vector generation unit 124 and surrounding words in the vicinity of the word instance. The context information generation unit 125 generates an extended vector by appending the context filter at the end of a corresponding word vector and associates the extended vector with the word instance.

The search unit 126 performs a search process for searching a document for similar sentences to an input sentence, as one of methods using extended vectors stored in the vector storage unit 122.

For example, the search unit 126 computes a context filter for each word instance included in an input sentence and computes an extended vector by concatenating the context filter to a corresponding word vector, in the same way as the context information generation unit 125 does. The search unit 126 computes a similarity index value (or a distance index value), such as cosine similarity, between extended vectors stored in the vector storage unit 122 and the extended vectors of the input sentence. Here, context filters are also taken into account for the similarity. The search unit 126 extracts a sentence with an extended vector whose similarity exceeds a threshold (or an extended vector whose distance is less than a threshold). A sentence including a word instance whose word vector is the same but whose context filter is not similar is unlikely to be extracted. That is, sentences are narrowed down taking into account the similarities of contexts.

In addition, for example, the search unit 126 performs a search process using only the context filters of extended vectors, to search for a sentence including a word instance having a similar context filter. More specifically, the search unit 126 computes a similarity index value (or a distance index value), such as cosine similarity, between a context filter and other context filters. Then, the search unit 126 adds a sentence including a context filter whose similarity exceeds a threshold (or whose distance is less than a threshold) to the search result.

Words at word instances having different word vectors and similar context filters may be taken as different words due to a spelling mistake or spelling variant. In such cases, the search unit 126 presents a sentence including a word instance that probably has a spelling mistake or spelling variant to let a user to confirm. The search unit 126 may prompt the user to correct the word spelling. Alternatively, the search unit 126 may automatically correct the word spelling that is probably a spelling mistake or spelling variant. After the word spelling is corrected, the word vector generation unit 124 may learn again word vectors, or word embeddings, on the basis of the corrected document. In addition, the context information generation unit 125 may learn again a context filter for each word instance on the basis of the corrected document.

The meaning determination unit 127 performs a meaning determination process for determining a correct meaning for each word instance among two or more possible meanings, as one of methods using extended vectors stored in the vector storage unit 122. The meaning determination process uses teacher labels stored in the teacher data storage unit 123. Using relationships between the context filters for word instances assigned teacher labels and the correct meanings indicated by the teacher labels, the meaning determination unit 127 automatically determines meanings for the other unlabeled word instances and assigns labels to the other word instances.

The following describes word vectors that are word embeddings.

Figure 4:
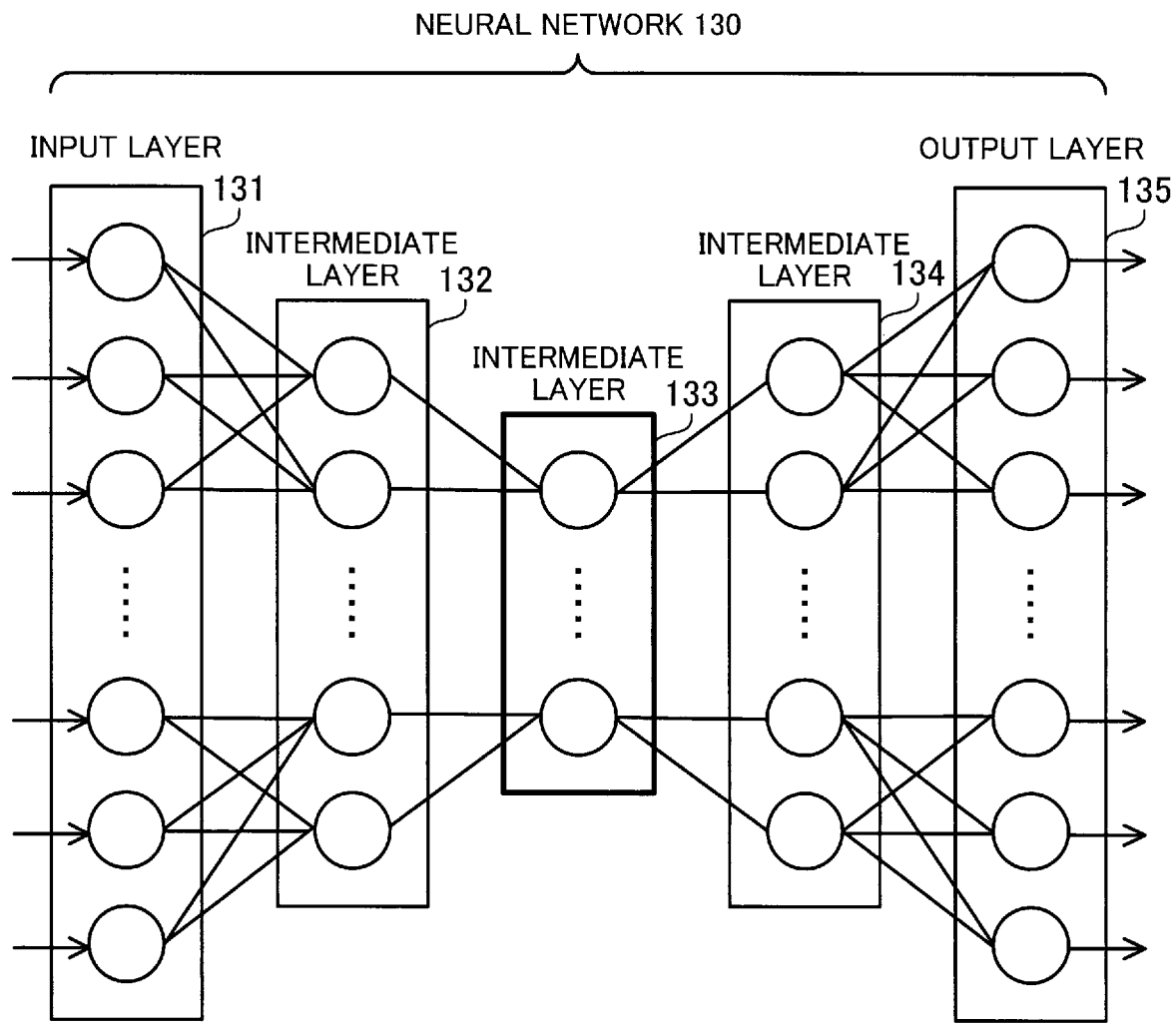
FIG. 4 illustrates an example of a neural network.

FIG. 4 illustrates an example of a neural network.

A neural network 130 is used to compute word vectors, or word embeddings. This neural network 130 is a multilayer neural network. The neural network 130 includes a plurality of nodes corresponding to neurons and edges corresponding to synapses between the nodes. Nodes in adjacent layers are connected by a synapse. A synapse is given a weight, and a value computed by multiplying the value of a node in a layer by the weight is given to a node in the next layer. Weights for the synapses are determined through training of the neural network 130.

The neural network 130 includes an input layer 131, intermediate layers 132 to 134, and an output layer 135. FIG. 4 illustrates three intermediate layers, but any number of intermediate layers may be used.

The input layer 131 includes a plurality of nodes corresponding to a plurality of words that may occur in a document. One node in the input layer 131 corresponds to one word. In the case where a certain word is selected as a reference, "1" is input to the node corresponding to the word in question, and "0" is input to the other nodes. The intermediate layer 132 is next to the input layer 131 and includes fewer nodes than the input layer 131. The intermediate layer 133 is next to the intermediate layer 132 and includes fewer nodes than the intermediate layer 132. The intermediate layer 133 has the fewest dimensions in the neural network 130.

The intermediate layer 134 is next to the intermediate layer 133 and includes more nodes than the intermediate layer 133. The output layer 135 includes a plurality of nodes corresponding to the plurality of words that may occur in the document. One node in the output layer 135 corresponds to one word. The input layer 131 and the output layer 135 have the same number of dimensions. In the case where a word is input as a reference to the input layer 131, each node in the output layer 135 outputs a predicted value according to the occurrence probability that the word corresponding to the node occurs as a surrounding word in the vicinity of the reference word. As an output, a greater predicted value of a word means a higher occurrence probability of the word.

Plural combinations, each made up of a word and its surrounding words, may be extracted from a document. Therefore, a weight for each synapse may be determined using these combinations as training data such as to reduce a loss indicating a difference between a result of predicting surrounding words and actual surrounding words. After the training of the neural network 130 is complete, the word vector generation unit 124 inputs one word to the input layer 131 and extracts a vector listing the values held in the nodes in the intermediate layer 133 having the fewest dimensions. The word vector generation unit 124 uses the extracted vector as the word vector of the input word. In the manner described above, a word vector is determined for each word that may occur in the document.

FIG. 5 illustrates an example of computing word vectors, or word embeddings.

A document 141 is an example of a document stored in the document storage unit 121. The word vector generation unit 124 divides the document 141 into sentences and then divides each sentence into words. For example, the document 141 may be divided into sentences with reference to the Japanese full stop. Each sentence may be divided into words with Japanese morphological analysis. The word vector generation unit 124 extracts word instances from the document 141. In this connection, word instances of particles and other generic words with less importance are excluded from the extraction.

With respect to each extracted word instance, the word vector generation unit 124 extracts n surrounding words before and after the word instance. A range of n surrounding words before and after a word instance is a range of n words occurring before the word instance and n words occurring after the word instance, within the same sentence as the word instance. Here, n is a parameter taking a prescribed natural number and is set by a user in advance. Therefore, plural combinations, each made up of a word and its surrounding words, are extracted from the document 141. The word vector generation unit 124 generates a surrounding word table 142. The surrounding word table 142 contains the combinations of words and surrounding words. Two or more surrounding words may be extracted for a word instance.

For example, the document 141 includes the following sentences: "KANGAE GA AMAI." (meaning "The idea is naive."); "RINGO GA AMAI." (meaning "The apple is sweet."); "IGI WO TONAERU." (meaning "State the significance."); "IGI WO TONAERU." (meaning "State an objection."); and "IKU KOTO NI IGI GA ARU." (meaning "To go is what counts."). Note that the third sentence is intended to provide the same meaning as the fourth sentence, but the Chinese character for the word "IGI" is a spelling mistake and this changes its meaning as above. The word vector generation unit 124 extracts a combination of the word "KANGAE" and its surrounding word "AMAI" and also extracts a combination of the word "AMAI" and its surrounding word "KANGAE" from the first sentence. In addition, the word vector generation unit 124 extracts the word "RINGO" and its surrounding word "AMAI" and also extracts a combination of the word "AMAI" and its surrounding word "RINGO" from the second sentence.

Further, the word vector generation unit 124 extracts a combination of the word "IGI" and its surrounding word "TONAERU" and a combination of the word "TONAERU" and its surrounding word "IGI" from the third sentence. Still further, the word vector generation unit 124 extracts a combination of the word "IGI" and its surrounding word "TONAERU" and a combination of the word "TONAERU" and its surrounding word "IGI" from the fourth sentence. Still further, the word vector generation unit 124 extracts a combination of the word "IKU" and its surrounding words "KOTO," "IGI," and "ARU," and a combination of the word "KOTO" and its surrounding words "IKU," "IGI," and "ARU" from the fifth sentence. Also, the word vector generation unit 124 extracts a combination of the word "IGI" and its surrounding words "IKU," "KOTO," and "ARU," and a combination of the word "ARU" and its surrounding words "IKU," "KOTO," and "IGI."

FIG. 6 illustrates a continuation of the example of computing word vectors, or word embeddings.

The word vector generation unit 124 uses the correspondences between words and their surrounding words, listed in the surrounding word table 142, to train the earlier-described neural network 130. To this end, the word vector generation unit 124 feeds words including "KANGAE," "AMAI," "RINGO," "IGI," "TONAERU," "IGI," "IKU," "KOTO," and "ARU" one by one to the neural network 130 to have their respective word vectors computed. Note that the above two "IGI" have different Chinese characters.

The word vector generation unit 124 generates a word vector table 143. The word vector table 143 associates each word vector with a corresponding word. The word vector table 143 is stored in the vector storage unit 122. In the second embodiment, as an example, the intermediate layer 133 in the neural network 130 has 200 dimensions and each word vector is a 200-dimensional vector. Note that the number of dimensions is variable to 300 dimensions or another. Each word vector has real-valued dimensions. For simple explanation, FIG. 6 illustrates an example of values in the first six dimensions of each word vector. For example, the word "KANGAE" has a word vector (1.38, 0.02, 0.38, 0.001, 0.007, 0.013, . . . ).

The following describes a context filter.

Figure 7:
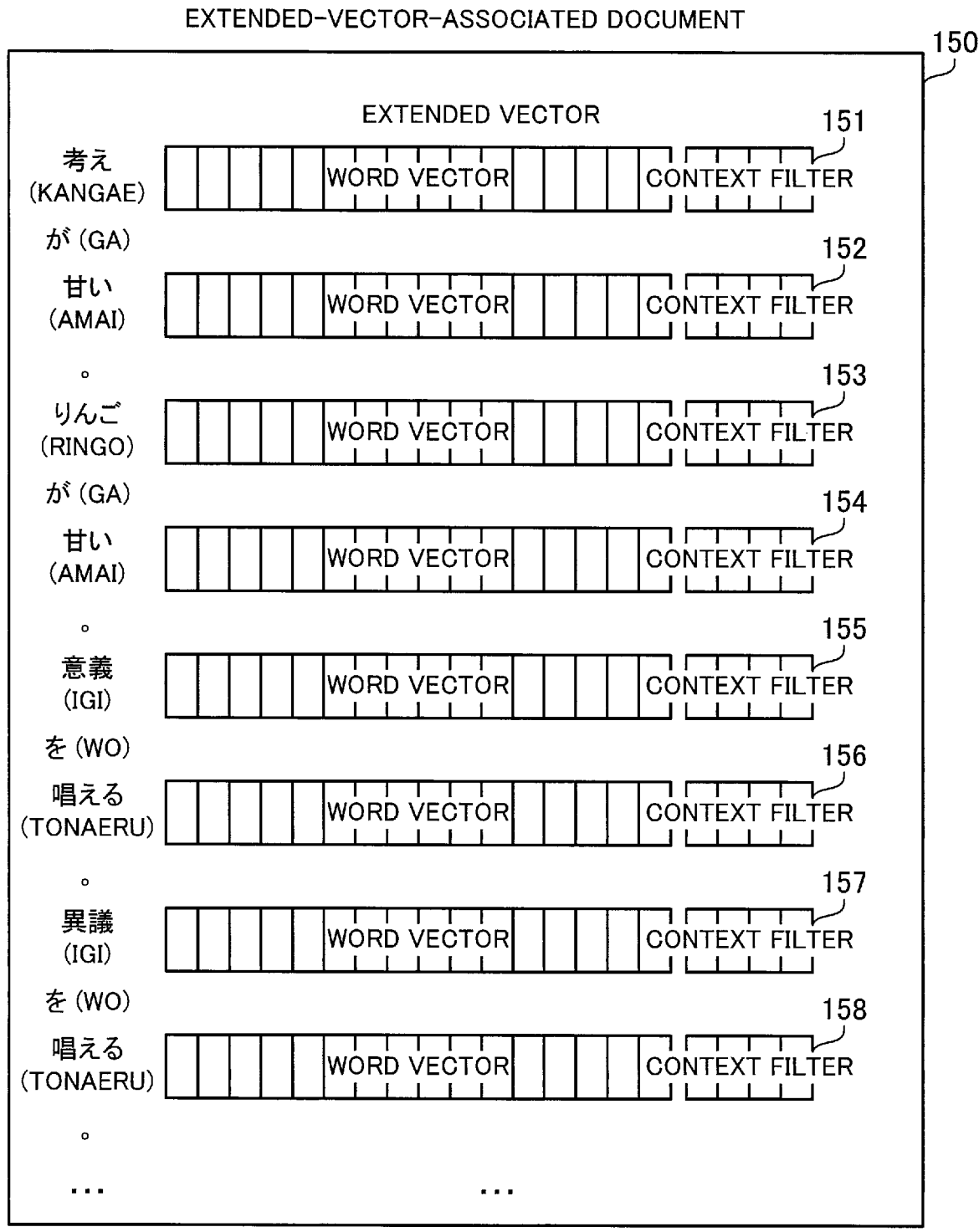
FIG. 7 illustrates an example of an extended-vector-associated document.

FIG. 7 illustrates an example of an extended-vector-associated document.

Each word instance in the document 141 is associated with an extended vector to make it easy to perform a variety of natural language processing. An extended vector is generated by concatenating a word vector and a context filter. In the second embodiment, the word vectors have 200 dimensions and the context filters have 50 dimensions, and so the extended vectors have 250 dimensions.

Since a unique word vector is associated with every word, extended vectors for a plurality of word instances regarding the same word include the same word vector. In addition, since different occurrence positions of the same word have different contexts, extended vectors for different word instances have, in principal, different context filters. With respect to a word having two or more meanings, extended vectors for word instances that have different meanings are expected to include dissimilar context filters. On the other hand, with respect to words taken as different words due to a spelling mistake or spelling variant, extended vectors for word instances of the words are expected to include different word vectors but similar context filters.

The word vector generation unit 124 generates an extended-vector-associated document 150 on the basis of the document 141. The extended-vector-associated document 150 is stored in the vector storage unit 122. For example, word instances including "KANGAE," "AMAI," "RINGO," "AMAI," "IGI," "TONAERU," "IGI," "TONAERU," and others are extracted from the document 141.

The first word instance "KANGAE" is associated with an extended vector 151. The second word instance "AMAI" is associated with an extended vector 152. The third word instance "RINGO" is associated with an extended vector 153. The fourth word instance "AMAI" is associated with an extended vector 154. The fifth word instance "IGI" is associated with an extended vector 155. The sixth word instance "TONAERU" is associated with an extended vector 156. The seventh word instance "IGI" is associated with an extended vector 157. The eighth word instance "TONAERU" is associated with an extended vector 158.

The word "AMAI" has some different meanings, and the second word instance "AMAI" and the fourth word instance "AMAI" have the same Chinese character but different meanings. Therefore, the extended vectors 152 and 154 include the same word vector but dissimilar context filters. In addition, the Chinese character at the fifth word instance "IGI" is a spelling mistake for that at the seventh word instance "IGI." Therefore, the extended vectors 155 and 157 include different word vectors but similar context filters.

Context filters are generated as described below.

Figure 8:
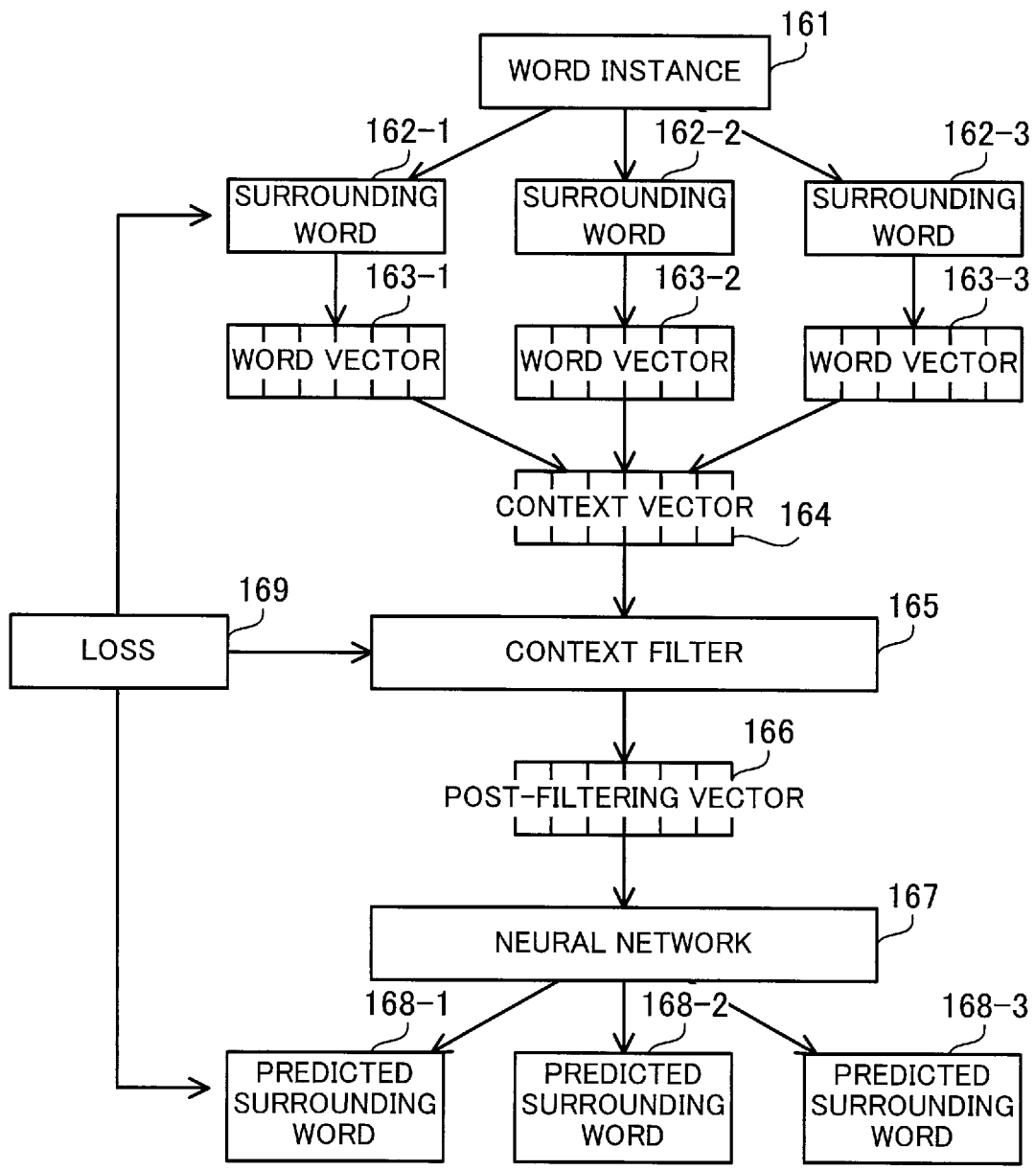
FIG. 8 illustrates an example of how to generate a context filter.

FIG. 8 illustrates an example of how to generate a context filter.

The context information generation unit 125 selects a word instance 161. The context information generation unit 125 then extracts n words before and after the word instance 161 as surrounding words. A range for extracting surrounding words may be the same as that used in computation of word vectors, or word embeddings, by the word vector generation unit 124. That is, the range is set to a range of n words occurring before the word instance 161 and n words occurring after the word instance 161 within the same sentence as the word instance 161. Therefore, it is possible to use the surrounding word table 142 generated by the word vector generation unit 124 for this extraction.

Assume now that surrounding words 162-1 to 162-3 are extracted. Then, the context information generation unit 125 obtains word vectors 163-1 to 163-3 respectively corresponding to the surrounding words 162-1 to 162-3. The context information generation unit 125 computes a context vector 164 by adding these word vectors 163-1 to 163-3. Here, the word vectors 163-1 to 163-3 are added by adding their values in each dimension. Therefore, the word vectors 163-1 to 163-3 and the context vector 164 all have 200 dimensions.

The context information generation unit 125 applies a context filter 165 to the context vector 164 to thereby compute a post-filtering vector 166. When the computation of the context filter 165 starts for the word instance 161, the context filter 165 is initialized. The initial value for the context filter 165 may be set to a prescribed value, or may be randomly set for each word instance. The context filter 165 has fewer dimensions than the context vector 164. In the second embodiment, the number of dimensions of the context filter 165 is one fourth the number of the dimensions of the context vector 164.

The context information generation unit 125 multiplies the values in the dimensions of the context vector 164 by the values in the corresponding dimensions of the context filter 165. The context vector 164 and post-filtering vector 166 both have 200 dimensions. Since the number of dimensions of the context filter 165 is one fourth the number of dimensions of the context vector 164, one dimension of the context filter 165 is allotted to four continuous dimensions of the context vector 164. For example, each value in the first to fourth dimensions of the context vector 164 is multiplied by the value in the first dimension of the context filter 165.

The context information generation unit 125 feeds the post-filtering vector 166 to a neural network 167. The neural network 167 is a machine learning model for predicting surrounding words from an input vector. As the neural network 167, it is possible to repurpose the neural network 130 trained at the time of generation of word vectors, or word embeddings. In this case, the post-filtering vector 166 may be input to the intermediate layer 133. The neural network 167 outputs predicted surrounding words 168-1 to 168-3.

The context information generation unit 125 computes a loss 169 (prediction loss) indicating a difference between the predicted surrounding words 168-1 to 168-3 and the correct surrounding words 162-1 to 162-3. The neural network 167 may output, as a prediction result, a vector which has a length equivalent to the number of words that may occur in the document and which lists values each indicating the probability that a word is a surrounding word. In this case, for example, the sum of absolute values of the differences in respective dimensions between the correct vector and the prediction result vector may be taken as the loss 169.

The context information generation unit 125 updates the context filter 165 such as to reduce the loss 169. The context filter 165 may be updated using one of various search algorithms. By repeating the above process, it is possible to compute the context filter 165 corresponding to the word instance 161.

Note that the context vector 164 generated by adding the word vectors 163-1 to 163-3 of the surrounding words 162-1 to 162-3 may have the same values as generated from another combination pattern of surrounding words, and so may represent an unintended context. In addition, if the word vectors 163-1 to 163-3 are concatenated, the generated vector has a large number of dimensions and has redundancies. By contrast, the context filter 165 indicates how significant each dimension of the context vector 164 is to distinguish contexts. Therefore, the context filter 165 may be said to be compact information sufficient to distinguish contexts.

Figure 9:
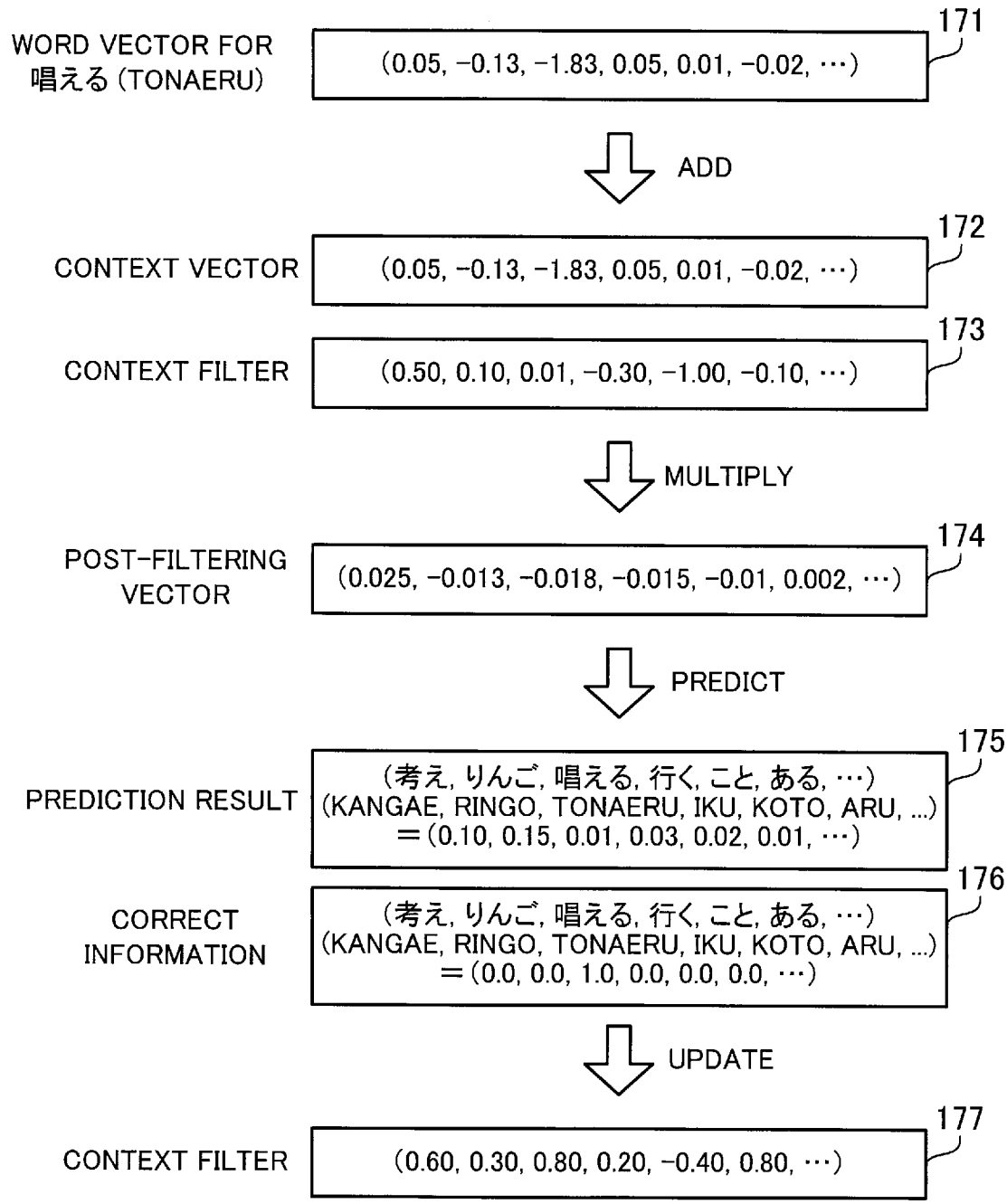
FIG. 9 illustrates a first example of generating a context filter.

FIG. 9 illustrates a first example of generating a context filter.

Here, consider the case of generating a context filter for the word instance "IGI" in the third sentence of the document 141 illustrated in FIG. 5.

The context information generation unit 125 extracts a surrounding word "TONAERU" of the word instance "IGI" and selects a word vector 171 for "TONAERU" from the word vector table 143. Since only one surrounding word is extracted, the word vector 171 is taken as a context vector 172. In addition, the context information generation unit 125 generates a randomly initialized context filter 173. The context information generation unit 125 applies the context filter 173 to the context vector 172 to thereby compute a post-filtering vector 174.

For simple explanation, it is assumed that the context vector 172 and the context filter 173 have the same number of dimensions. For example, in the case where the context vector 172 has a value of 0.05 in the first dimension and the context filter 173 has a value of 0.50 in the first dimension, then the value in the first dimension of the post-filtering vector 174 is computed as 0.05×0.50=0.025.

The context information generation unit 125 inputs the post-filtering vector 174 to the intermediate layer 133 of the neural network 130 to thereby obtain a prediction result 175 from the output layer 135 of the neural network 130. The prediction result 175 is a vector listing values based on the probabilities (reliability) that each individual word that may occur in the document is a surrounding word. The context information generation unit 125 compares the prediction result 175 with correct information 176 to compute a loss. The correct information 176 is a vector indicating correct surrounding words and has a value of "1" for a word that is a surrounding word and a value of "0" for a word that is not a surrounding word.

The loss is a value computed by adding the absolute values of the differences between the prediction result 175 and the correct information 176 with respect to each word. For example, assume that the prediction result indicates a value of 0.10 for the word "KANGAE," a value of 0.15 for the word "RINGO," a value of 0.01 for the word "TONAERU," a value of 0.03 for the word "IKU," a value of 0.02 for the word "KOTO," and a value of 0.01 for the word "ARU." Only the word "TONAERU" is a correct surrounding word, and therefore the loss is computed as 0.10+0.15+(1.0−0.01)+0.03+0.02+0.01+ . . .

The context information generation unit 125 updates the context filter 173 to a context filter 177 such as to reduce the computed loss. For example, the value in the first dimension is updated from 0.50 to 0.60, the value in the second dimension is updated from 0.10 to 0.30, the value in the third dimension is updated from 0.01 to 0.80, the value in the fourth dimension is updated from −0.30 to 0.20, the value in the fifth dimension is updated from −1.00 to −0.40, and the value in the sixth dimension is updated from −0.10 to 0.80.

Figure 10:
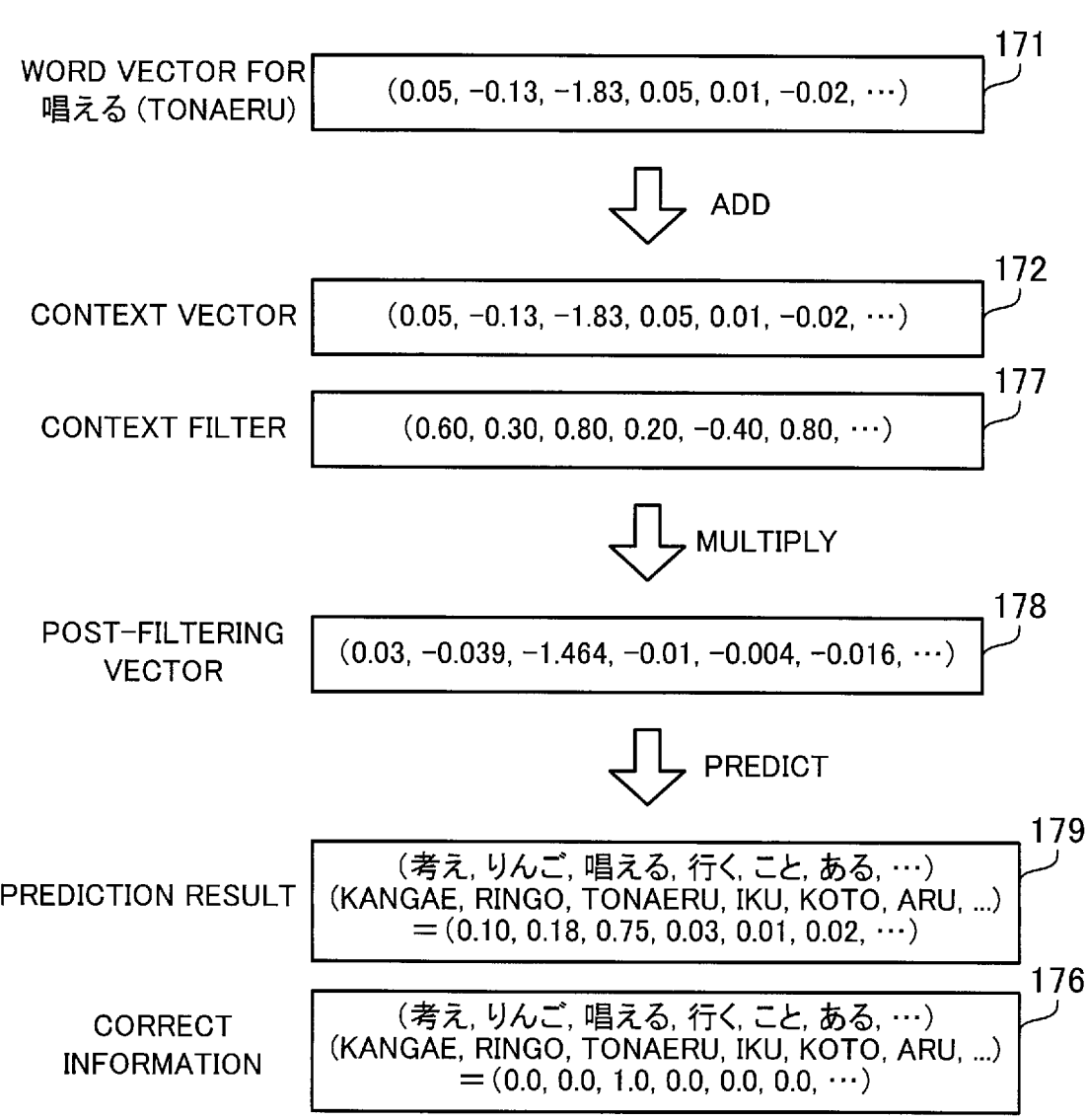
FIG. 10 illustrates a continuation of the first example of generating a context filter.

FIG. 10 illustrates a continuation of the first example of generating a context filter.

The context information generation unit 125 applies the updated context filter 177 to the context vector 172 computed from the word vector 171 corresponding to the surrounding word "TONAERU" to thereby compute a post-filtering vector 178. For example, in the case where the context vector 172 has a value of 0.05 in the first dimension and the context filter 177 has a value of 0.60 in the first dimension, the value in the first dimension of the post-filtering vector 178 is computed as 0.05×0.60=0.03.

The context information generation unit 125 inputs the post-filtering vector 178 to the intermediate layer 133 of the neural network 130, to thereby obtain a prediction result 179 from the output layer 135 of the neural network 130. The context information generation unit 125 compares the prediction result 179 with the correct information 176 to compute a loss. For example, assume that the prediction result indicates a value of 0.10 for the word "KANGAE," a value of 0.18 for the word "RINGO," a value of 0.75 for the word "TONAERU," a value of 0.03 for the word "IKU," a value of 0.01 for the word "KOTO," and a value of 0.02 for the word "ARU." In this case, the loss is computed as 0.10+0.18+(1.0−0.75)+0.03+0.01+0.02+ . . .

After repeatedly predicting surrounding words and updating the context filter a prescribed number of times, as described above, the context information generation unit 125 fixes the context filter. Even with respect to the word instance "IGI" included in the fourth sentence of the document 141 of FIG. 5, the same context filter as in the word instance "IGI" included in the third sentence is generated because these two "IGI" have the same surrounding word. Therefore, the extended vectors 155 and 157 of FIG. 7 have different word vectors and the same context filter.

Figure 11:
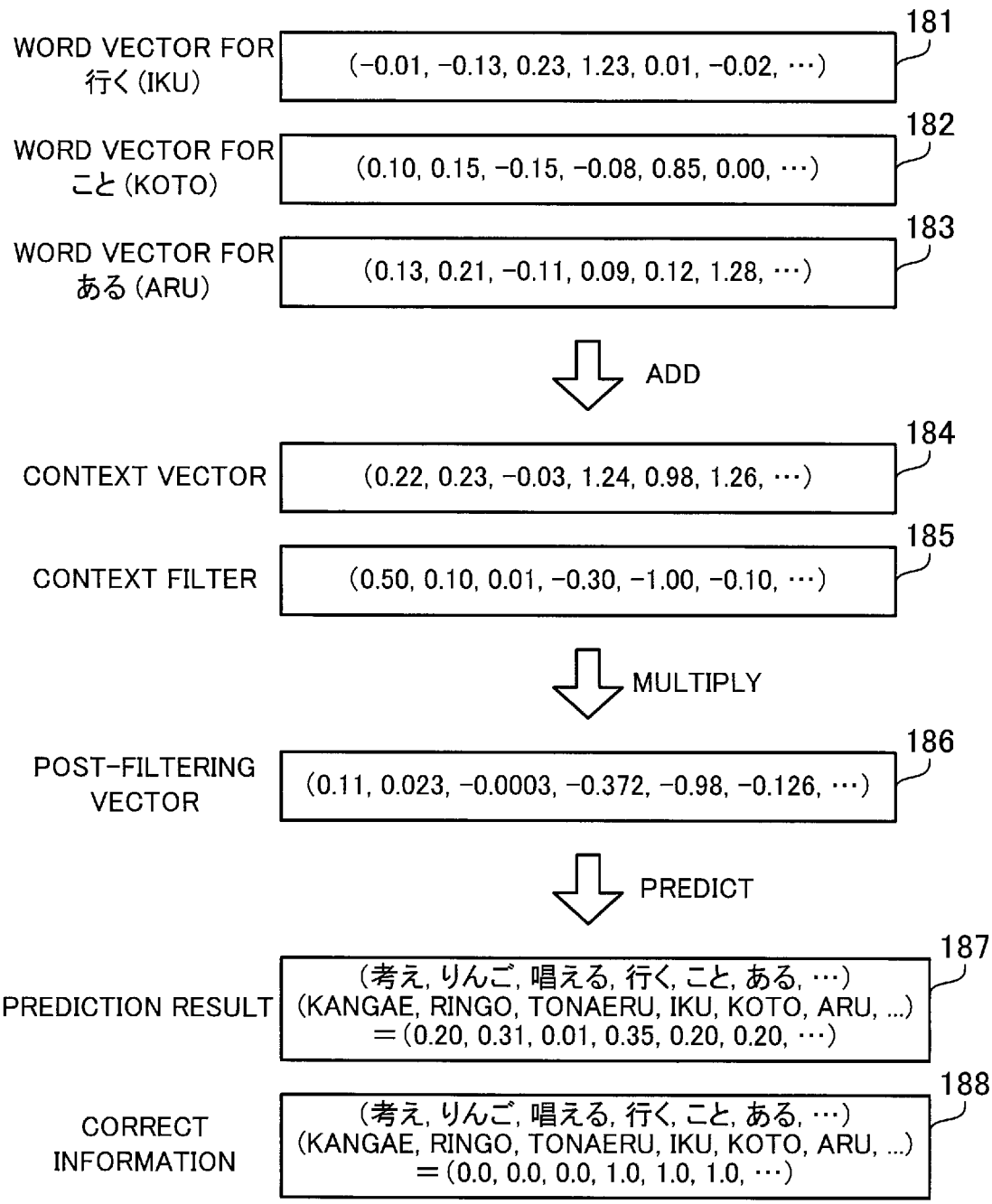
FIG. 11 illustrates a second example of generating a context filter.

FIG. 11 illustrates a second example of generating a context filter.

Consider now the case of generating a context filter for the word instance "IGI" included in the fifth sentence of the document 141 illustrated in FIG. 5.

The context information generation unit 125 extracts surrounding words "IKU," "KOTO," and "ARU" of the word instance "IGI" and selects word vectors 181 to 183 for "IKU," "KOTO," and "ARU" from the word vector table 143. The context information generation unit 125 computes a context vector 184 by adding the word vectors 181 to 183. For example, in the case where the word vector 181 has a value of −0.01 in the first dimension, the word vector 182 has a value of 0.10 in the first dimension, and the word vector 183 has a value of 0.13 in the first dimension, the value in the first dimension of the context vector 184 is computed as −0.01+0.10+0.13=0.22.

In addition, the context information generation unit 125 generates a randomly initialized context filter 185. The context information generation unit 125 applies the context filter 185 to the context vector 184 to thereby compute a post-filtering vector 186. For example, in the case where the context filter 185 has a value of 0.50 in the first dimension, the value in the first dimension of the post-filtering vector 186 is computed as 0.22×0.50=0.11.

The context information generation unit 125 inputs the post-filtering vector 186 to the intermediate layer 133 of the neural network 130 to thereby obtain a prediction result 187 from the output layer 135 of the neural network 130. The context information generation unit 125 compares the prediction result 187 with correct information 188 to compute a loss. For example, assume that the prediction result 187 includes a value of 0.20 for the word "KANGAE," a value of 0.31 for the word "RINGO," a value of 0.01 for the word "TONAERU," a value of 0.35 for the word "IKU," a value of 0.20 for the word "KOTO," and a value of 0.20 for the word "ARU." The correct surrounding words are "IKU," "KOTO," and "ARU." Therefore, the loss is computed as 0.20+0.31+0.01+(1.0−0.35)+(1.0−0.20)+(1.0−0.20)+ . . . . The context information generation unit 125 updates the context filter 185 such as to reduce the computed loss.

In the example of FIGS. 9 and 10 and the example of FIG. 11, context filters are computed for the same word "IGI." However, the word instance in FIGS. 9 and 10 and the word instance in FIG. 11 have completely different surrounding words, and therefore dissimilar context filters are generated.

The following describes examples of a search process using context filters.

Assume now that there are sentences, "KANGAE GA AMAI." and "RINGO GA AMAI." These two sentences contain the same word "AMAI" but use this word "AMAI" to provide different meanings (the former "AMAI" means "naive," whereas the latter "AMAI" means "sweet"). Therefore, it is not right to give the same translation word to the word "AMAI" in these two sentences in machine translation. When the search unit 126 makes an attempt to search for a sentence that contains the word "AMAI" with the former meaning, it computes similarity using the entire extended vectors including the context filters, thereby making it possible to narrow down sentences properly.

As another example, assume that a document includes a word "service" and a word "service." The latter is a spelling mistake for the former. A word vector for the word "service" and a word vector for the word "service" are probably not similar. However, a context filter for the word instance "service" and a context filter for the word instance "service" are probably similar. Therefore, in searching for a sentence that contains the word "service," the search unit 126 further searches for a sentence including a word instance with a similar context filter, so as to include a sentence containing the word "service" in a search result. This approach reduces the risk of search failure. At this time, the spelling mistake "service" may automatically be corrected or a user may be prompted to correct it. In the example described earlier, the spelling mistake in the Chinese character for the word "IGI" may be corrected in the same way.

As yet another example, assume that a document includes both an expression "servicepack" without a space and an expression "service pack" with a space. The word "servicepack" is extracted from the former expression, and the word "service" is extracted from the latter expression. Different word vectors are associated with these words "servicepack" and "service."

In a sentence that contains the word "service" with the same context as "servicepack," a context filter for the word instance "service" is similar to that for the word instance "servicepack." Therefore, the search unit 126 is able to find a sentence containing "service pack," in addition to a sentence containing "servicepack," through a search using context filters. In addition, in a sentence that contains the word "service" with a different context from "servicepack," a context filter for the word instance "service" is not similar to that for the word instance "servicepack." Therefore, the search unit 126 is able to exclude sentences having different contexts, like a sentence containing a word other than "pack" following "service," through the search using context filters.

The following describes how the machine learning apparatus 100 operates.

Figure 12:
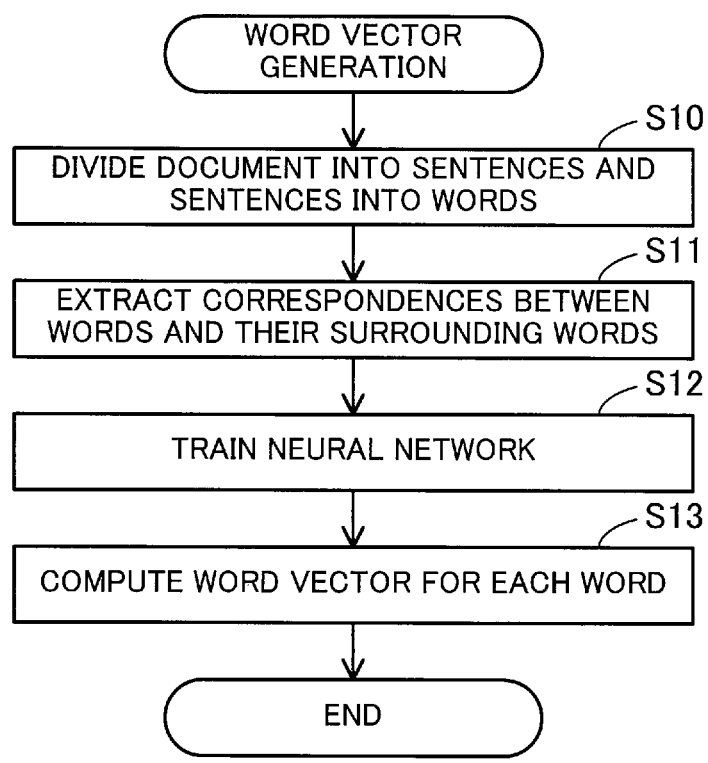
FIG. 12 is a flowchart illustrating an example of how to generate a word vector.

FIG. 12 is a flowchart illustrating an example of how to generate a word vector.

(S10) The word vector generation unit 124 divides a document into sentences and then the sentences into words.

(S11) The word vector generation unit 124 extracts, with respect to each word instance (i.e., each occurrence position of words) included in the document, surrounding words within a prescribed range, for example, n words before and after the word instance, from the same sentence as the word instance. The word vector generation unit 124 then generates the surrounding word table 142 indicating correspondences between words and their surrounding words.

(S12) The word vector generation unit 124 trains the neural network 130 with reference to the surrounding word table 142. In training the neural network 130, the word vector generation unit 124 compares predicted surrounding words, which are output from the output layer 135 after inputting a word to the input layer 131, with actual surrounding words, and updates weights such as to reduce a loss.

(S13) After the training of the neural network 130 is complete, the word vector generation unit 124 inputs each word to the input layer 131 of the neural network 130 and obtains a vector listing the values of the nodes of the intermediate layer 133, as a word vector for the word. The word vector generation unit 124 records the obtained word vectors in the word vector table 143.

Figure 13:
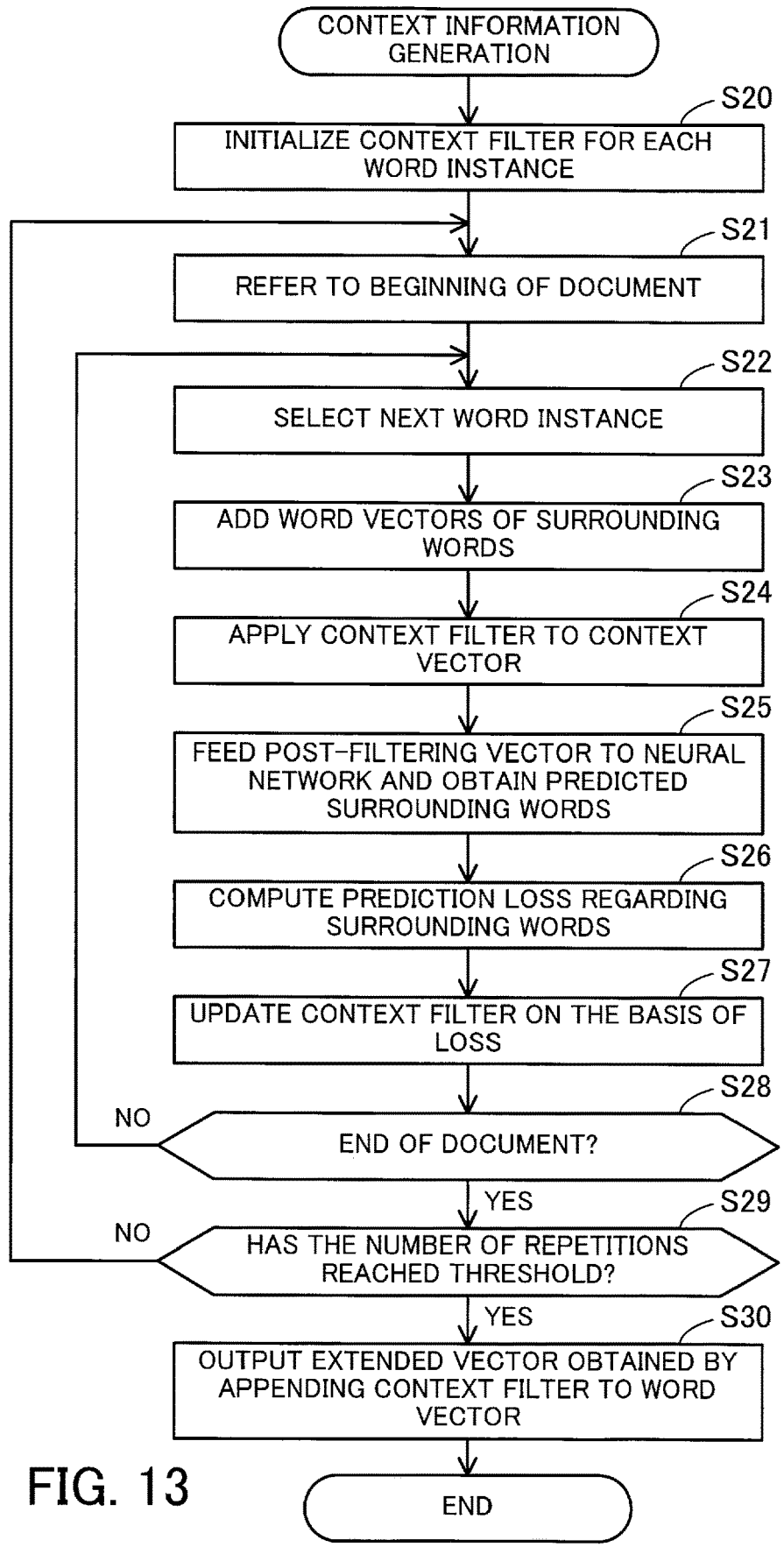
FIG. 13 is a flowchart illustrating an example of how to generate context information.

FIG. 13 is a flowchart illustrating an example of how to generate context information.

(S20) The context information generation unit 125 assigns a context filter to each word instance included in a document and initializes each context filter.

(S21) The context information generation unit 125 refers to the beginning of the document.

(S22) The context information generation unit 125 selects the word instance following the current reference position among the plurality of word instances included in the document.

(S23) The context information generation unit 125 obtains surrounding words within a prescribed range from the word instance selected at step S22. The surrounding words may be found from the above-described surrounding word table 142. The context information generation unit 125 searches the word vector table 143 to obtain a word vector corresponding to each surrounding word. The context information generation unit 125 computes a context vector by adding the word vectors of the surrounding words.

(S24) The context information generation unit 125 applies the context filter corresponding to the word instance to the context vector computed at step S23. In applying the context filter, the values in the dimensions of the context vector are multiplied by the values in the corresponding dimensions of the context filter. By doing so, a post-filtering vector is computed.

(S25) The context information generation unit 125 inputs the post-filtering vector computed at step S24 to the intermediate layer 133 of the neural network 130 trained at the time of generation of word vectors. The context information generation unit 125 obtains a result of predicting surrounding words, from the output layer 135 of the neural network 130. Alternatively, another machine learning model that is able to predict surrounding words from an input vector may be used, instead of the neural network 130.

(S26) The context information generation unit 125 computes a loss by comparing the result of predicting surrounding words obtained at step S25 with the actual surrounding words obtained at step S23.

(S27) The context information generation unit 125 updates the context filter on the basis of the loss computed at step S26 such as to reduce the loss.

(S28) The context information generation unit 125 determines whether the reference position has reached the end of the document, i.e., whether the currently selected word instance is the last word instance in the document. If the reference position has reached the end of the document, the process proceeds to step S29. Otherwise, the process proceeds to step S22 to select a next word instance.

(S29) The context information generation unit 125 determines whether the number of repetitions of steps S21 to S28 has reached a prescribed threshold. That is, the context information generation unit 125 determines whether the number of times of scanning the document from the beginning to the end has reached the threshold. If the number of repetitions has reached the threshold, the process proceeds to step S30. Otherwise, the process proceeds to step S21 to return to the beginning of the document.

(S30) The context information generation unit 125 generates, with respect to each word instance included in the document, an extended vector by appending the corresponding context filter to the corresponding word vector. The context information generation unit 125 outputs the generated extended vectors in association with the corresponding word instances. The extended vectors are used as indexes. For example, the context information generation unit 125 generates the extended-vector-associated document 150.

The following describes meaning determination using context filters.

Figure 14:
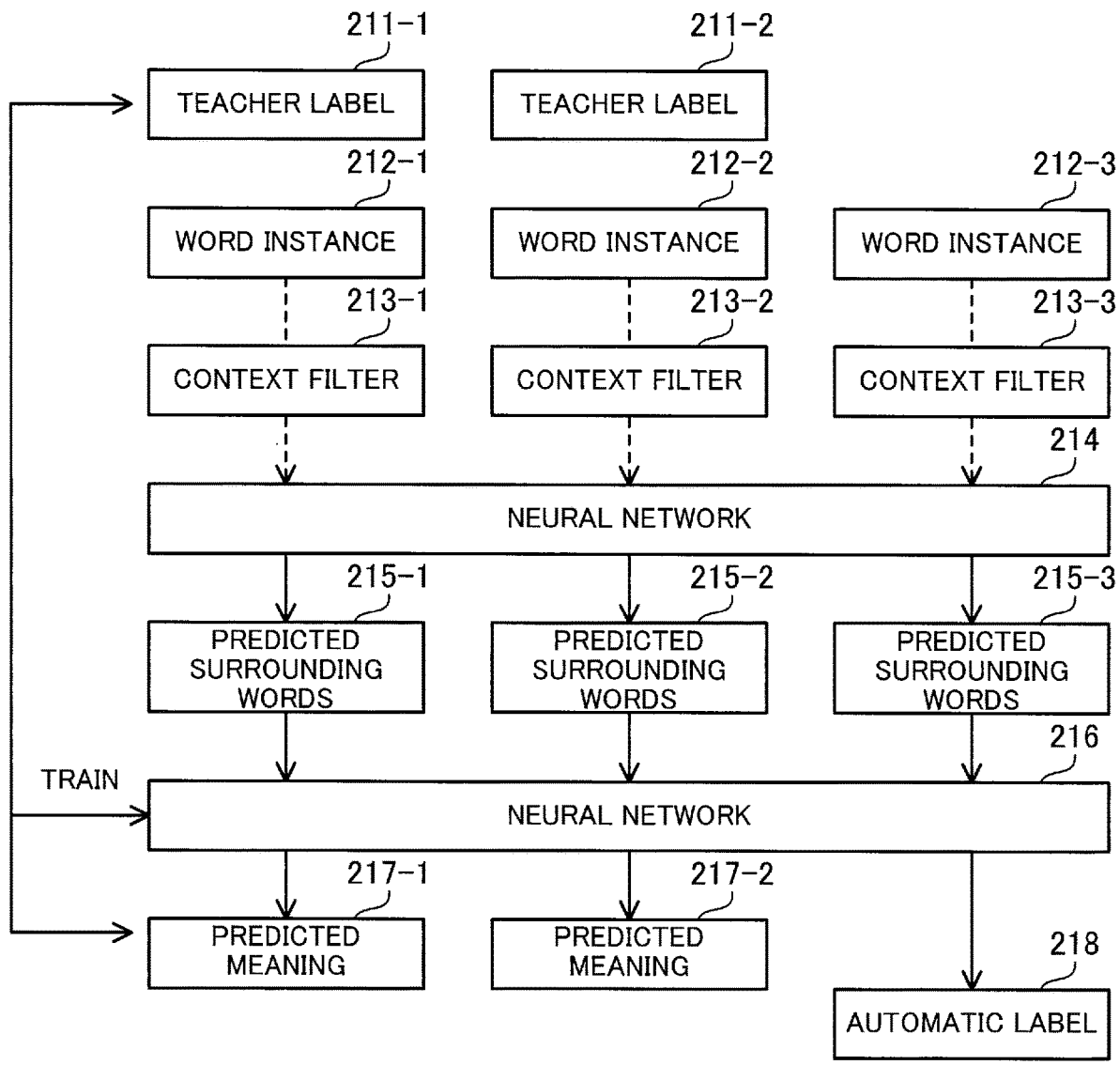
FIG. 14 illustrates a first example of how to determine meaning.

FIG. 14 illustrates a first example of how to determine meaning.

The meaning determination unit 127 determines, with respect to a word having two or more meanings, the meaning of the word for a word instance that has not been assigned any label, through supervised learning using teacher labels assigned to some word instances, and automatically assigns a label to the word instance.

The teacher data storage unit 123 stores therein, with respect to a certain word, a teacher label 211-1 assigned to a word instance 212-1 and a teacher label 211-2 assigned to a word instance 212-2. The teacher labels 211-1 and 211-2 are teacher data indicating different meanings among two or more meanings of the word. The meanings are manually specified for the word instances 212-1 and 212-2 and the teacher labels 211-1 and 211-2 are created.

The meaning determination unit 127 computes a context vector by adding the word vectors of surrounding words of the word instance 212-1, and then applies a corresponding context filter 213-1 to the context vector to thereby compute a post-filtering vector. The meaning determination unit 127 feeds the post-filtering vector to a neural network 214 to thereby obtain predicted surrounding words 215-1. Similarly, the meaning determination unit 127 computes a context vector by adding the word vectors of surrounding words of the word instance 212-2, and applies a corresponding context filter 213-2 to the context vector to thereby compute a post-filtering vector. The meaning determination unit 127 feeds the post-filtering vector to the neural network 214 to thereby obtain predicted surrounding words 215-2.

The neural network 214 is a machine learning model for predicting surrounding words from a post-filtering vector, and the above-described neural network 130 may be used. In addition, the first meaning determination method trains a neural network 216 different from the neural network 214. The neural network 216 is a machine learning model that receives an input of one or more surrounding words and outputs a result of predicting a meaning. The neural network 216 learns every word, for example.

The meaning determination unit 127 feeds the predicted surrounding words 215-1 to the neural network 216 and obtains a predicted meaning 217-1 corresponding to the word instance 212-1. In addition, the meaning determination unit 127 feeds the predicted surrounding words 215-2 to the neural network 216 and obtains a predicted meaning 217-2 corresponding to the word instance 212-2.

An input to the neural network 216 is a vector indicating whether each of a plurality of words is a predicted surrounding word. Assume here that an input value for a word being a predicted surrounding word is "1," and an input value for a word that is not a predicted surrounding word is "0." An output of the neural network 214 is binarized and then fed to the neural network 216. In the case where the neural network 214 outputs a value exceeding a threshold (for example, 0.5) as a value for a certain word, for example, the meaning determination unit 127 feeds a value of "1" for the word to the neural network 216. In the case where the neural network 214 outputs a value not exceeding the threshold, as a value for a certain word, for example, the meaning determination unit 127 feeds a value of "0" for the word to the neural network 216.

The meaning determination unit 127 compares the predicted meaning 217-1 with the teacher label 211-1, and the predicted meaning 217-2 with the teacher label 211-2. The meaning determination unit 127 updates weights set in the neural network 216 such as to reduce the differences between the predicted meanings 217-1 and 217-2 and their correct meanings indicated by the teacher labels 211-1 and 211-2.

After the training of the neural network 216 is complete, the meaning determination unit 127 selects a word instance 212-3 for which meaning has not been determined and therefore not assigned any label. The meaning determination unit 127 computes a context vector by adding the word vectors of surrounding words of the word instance 212-3, and then applies a corresponding context filter 213-3 to the context vector to thereby compute a post-filtering vector. The meaning determination unit 127 feeds the post-filtering vector to the neural network 214 to obtain predicted surrounding words 215-3.

The meaning determination unit 127 feeds the predicted surrounding words 215-3 to the neural network 216 to predict a meaning for the word instance 212-3, generates an automatic label 218 indicating the predicted meaning, and assigns the label to the word instance 212-3. As described above, the meaning determination unit 127 learns the relationships between predicted surrounding words and meanings using teacher data, and determines meaning for a word instance for which the meaning has not been determined, using the learned relationships.

The following describes another example of meaning determination.

Figure 15:
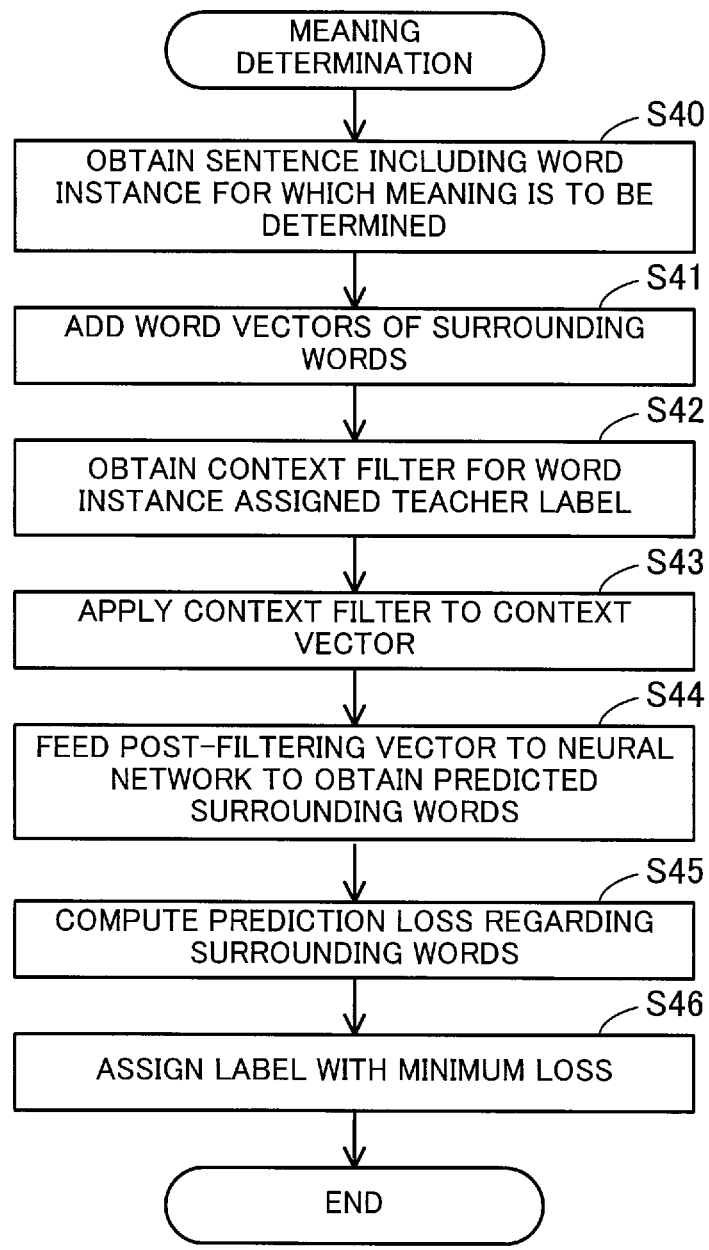
FIG. 15 is a flowchart illustrating a second example of how to determine meaning.

FIG. 15 is a flowchart illustrating a second example of how to determine meaning.

(S40) The meaning determination unit 127 obtains a sentence including a word instance for which meaning is to be determined.

(S41) The meaning determination unit 127 extracts surrounding words occurring within a prescribed range from the word instance, from the sentence obtained at step S40, and searches for word vectors corresponding to the surrounding words. The meaning determination unit 127 computes a context vector by adding the found word vectors.

(S42) The meaning determination unit 127 obtains two or more context filters associated with two or more word instances assigned teacher labels indicating different meanings.

(S43) The meaning determination unit 127 applies each of the two or more context filters obtained at step S42 to a corresponding context vector computed at step S41. Thereby, two or more post-filtering vectors corresponding to the different teacher labels are computed.

(S44) The meaning determination unit 127 feeds the two or more post-filtering vectors computed at step S43 to a neural network. The neural network is to predict surrounding words from an input vector and corresponds to the above-described neural network 130 and neural network 214. Thereby, the meaning determination unit 127 obtains different collections of predicted surrounding words respectively corresponding to the different teacher labels.

(S45) The meaning determination unit 127 computes a loss by comparing each collection of predicted surrounding words obtained at step S44 with a corresponding collection of actual surrounding words extracted at step S41.

(S46) The meaning determination unit 127 selects a teacher label with the minimum loss computed at step S45, among the two or more teacher labels. The meaning determination unit 127 determines that the meaning indicated by the selected teacher label is the meaning for the word instance in question. The meaning determination unit 127 assigns a label indicating the determined meaning to the word instance in question.

As described above, the machine learning apparatus 100 of the second embodiment computes, for each word instance indicating a single occurrence of a word, a context filter as context information, generates an extended vector by concatenating the context filter to a corresponding word vector, or word embedding, and associates the extended vector with the word instance.

By doing so, it is possible to achieve a compact representation of context for each occurrence position of a word. Here, note that a context vector that is an addition of word vectors of surrounding words may represent an unintended context, which causes ambiguity. To deal with this, a context filter is computed, which indicates which dimensions in the context vector are significant for identifying the context. The use of context filters as context information enables distinguishing different contexts from each other. In addition, since the word vectors of surrounding words are not concatenated but added, it is possible to prevent an increase in the number of dimensions in vectors. Thus, compared with machine learning algorithms taking into account the order of surrounding words, it is possible to reduce complexity of machine learning and to efficiently generate sufficient information for distinguishing contexts.

In addition, dissimilar context filters may be generated for different word instances of a word having two or more meanings. Therefore, by performing a search process using the entire extended vectors including the context filters, it is possible to improve the search accuracy for similar sentences. In addition, a label indicating a meaning is assigned to a word instance on the basis of the context filters, which contributes to an improvement in the accuracy of subsequent natural language processing. In addition, similar context filters may be generated for different spellings of a word that occur due to a spelling mistake or spelling variant. Therefore, by performing the search process using the context filters, it is possible to detect a word spelling that is probably a spelling mistake or spelling variant. The use of the context filters in this way makes it possible to complement word vectors, or word embeddings and to streamline the natural language processing.

According to one aspect, it is possible to efficiently generate context information for each occurrence position of words.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A context information generation method, comprising:
    obtaining, by a processor, a document including a sentence made up of a plurality of words and a plurality of word vectors that are word embeddings respectively computed for the plurality of words;
    extracting, by the processor, with respect to one word of the plurality of words, two or more surrounding words within a range from one occurrence position where the one word occurs, from the document, and computing a sum vector by adding two or more word vectors respectively corresponding to the two or more surrounding words;
    determining, by the processor, a parameter by converting the sum vector into an input vector by using the parameter, inputting the input vector into a trained machine learning model, calculating a loss between the two or more surrounding words and two or more predicted surrounding words predicted by the trained machine learning model in response to the input vector, and updating the parameter based on the loss; and
    storing, by the processor, the parameter as context information for the one occurrence position, in association with a word vector corresponding to the one word.

2. The context information generation method according to claim 1, wherein the parameter is a conversion filter.

3. The context information generation method according to claim 1, further comprising:
    storing, by the processor, another context information for another occurrence position where the one word occurs, in association with the word vector corresponding to the one word; and
    performing, by the processor, a search process for narrowing down to a sentence containing the one word, using the context information and said another context information in addition to the word vector corresponding to the one word.

4. The context information generation method according to claim 1, further comprising:
    storing, by the processor, another context information for another occurrence position where the one word occurs, in association with the word vector corresponding to the one word; and
    assigning, by the processor, labels for distinguishing different meanings of the one word to the one occurrence position and said another occurrence position, based on the context information and said another context information.

5. The context information generation method according to claim 1, further comprising:
    storing, by the processor, another context information for another occurrence position where the one word occurs, in association with the word vector corresponding to the one word; and
    adding, by the processor, a sentence including said another occurrence position to a result of searching for a sentence containing the one word, upon determining that a distance between the context information and said another context information is less than or equal to a threshold.

6. A context information generation apparatus, comprising:
    a memory configured to store therein a document including a sentence made up of a plurality of words and a plurality of word vectors that are word embeddings respectively computed for the plurality of words; and
    a processor configured to
        extract, with respect to one word of the plurality of words, two or more surrounding words within a range from one occurrence position where the one word occurs, from the document, compute a sum vector by adding two or more word vectors respectively corresponding to the two or more surrounding words,
        determine a parameter by converting the sum vector into an input vector by using the parameter, inputting the input vector into a trained machine learning model, calculating a loss between the two or more surrounding words and two or more predicted surrounding words predicted by the trained machine learning model in response to the input vector, and updating the parameter based on the loss, and
        store the parameter as context information for the one occurrence position, in association with a word vector corresponding to the one word.

7. A non-transitory computer-readable recording medium storing a computer program that causes a computer to perform a process comprising:
    obtaining a document including a sentence made up of a plurality of words and a plurality of word vectors that are word embeddings respectively computed for the plurality of words;
    extracting, with respect to one word of the plurality of words, two or more surrounding words within a range from one occurrence position where the one word occurs, from the document, and computing a sum vector by adding two or more word vectors respectively corresponding to the two or more surrounding words;
    determining a parameter by converting the sum vector into an input vector by using the parameter, inputting the input vector into a trained machine learning model, calculating a loss between the two or more surrounding words and two or more predicted surrounding words predicted by the trained machine learning model in response to the input vector, and updating the parameter based on the loss; and
    storing the parameter as context information for the one occurrence position, in association with a word vector corresponding to the one word.

* * * * *